Oct. 22, 1968  R. H. MILLER  3,406,650

METHOD FOR INCREASING THE LOAD CAPACITY OF A VESSEL

Filed May 14, 1964  7 Sheets-Sheet 1

INVENTOR.
ROBERT H. MILLER

ATTORNEYS

United States Patent Office 3,406,650
Patented Oct. 22, 1968

3,406,650
METHOD FOR INCREASING THE LOAD
CAPACITY OF A VESSEL
Robert H. Miller, Manitowoc, Wis., assignor to Manitowoc Shipbuilding, Inc., Manitowoc, Wis., a corporation of Wisconsin
Filed May 14, 1964, Ser. No. 367,439
4 Claims. (Cl. 114—77)

ABSTRACT OF THE DISCLOSURE

A method of increasing the load-carrying capacity of a vessel by severing the vessel into upper and lower parts, moving the upper part of the vessel relative to the lower part thereof while supporting the upper part by the lower part, and securing structure in the space formed between the upper and lower parts.

---

This invention relates to vessels and more particularly to a method for increasing the load carrying capacity of a vessel.

Dredging operations which are effective to widen and deepen shipping channels as well as the opening of the St. Lawrence Seaway, now enable vessels of greater load carrying capacity to travel along "inland" seaways, such as the Great Lakes, and to have access to ports, passageways, etc., which have heretofore been accessible by vessels of smaller capacity.

For example, one type or class of vessel to which the present invention may be applied is the Great Lakes Cargo or Bulk Carrier Steamer.

In such a vessel, it is common practice to stow in the cargo holds thereof bulk material, such as iron ore, coal, grain, and the like, each of which have different densities, with the iron ore, of course, being the highest density material and the grain having a density which is relatively lower.

Load carrying vessels are usually assigned a load water line by the American Bureau of Shipping and the United States Coast Guard which load line cannot be exceeded. The assigned load line of a vessel determines the distance the vessel extends out of the water when filled to maximum load or cargo carrying capacity. In other words, the assigned load line determines the freeboard of the vessel or the vertical distance between the main deck thereof and the water line when in a loaded condition. It is apparent that an assigned load line of a given vessel must be maintained in order to guarantee or assure the seaworthiness thereof, in case the vessel encounters rough seas or storms, so that a safety factor is provided should the vessel roll excessively or should the bow thereof go down into the water an excessive depth, as compared with normal steaming trim, as the vessel plows forward into a heavy sea.

Accordingly, it is an object of this invention to provide a method for increasing the load carrying capacity of a vessel without substantially altering the assigned load water line thereof.

It is also an object of the present invention to provide a method for increasing the load carrying capacity of a vessel which enables the vessel to substantially maintain an assigned load line, no matter whether the vessel is carrying relatively low density material, such as grain, or high density material such as ore.

It is a further object of this invention to provide a method for increasing the load carrying capacity of a vessel having given or predetermined dimensions to a capacity greater than that which the vessel was originally designed to carry.

It is another object of the present invention to provide a method for increasing the load carrying capacity of a vessel without increasing the draft beyond a depth which maintains the assigned load line thereof.

It is still another object of the present invention to provide a vessel with strake-like structure disposed at a location in the hull portion between the spar deck and the bottom thereof to increase the load carrying capacity of the vessel.

An additional object of the present invention is to provide a method of increasing the load carrying capacity of a vessel having given or predetermined dimensions by inserting into the hull of the vessel strake-like structure to increase the depth of the hull so that the load-carrying capacity of the vessel may be increased before the assigned load water line thereof is exceeded.

It is also an additional object of the present invention to provide a method of increasing the load carrying capacity of a vessel by cutting or slicing the hull thereof along a substantially longitudinally extending portion, separating the upper from the lower portion thereof, and thereafter securing strake-like structure in the space defined between the portions.

It is a further additional object of the present invention to provide a method of inserting strake-like structure in a vessel of given dimensions so as to increase the load carrying capacity thereof without substantially changing the assigned load water line of the vessel by cutting or slicing the hull of the vessel throughout a substantial longitudinal extent, thereafter disposing the vessel in a floating drydock instalaltion or facility, and then completing the slicing or cutting of the hull in two portions, separating the portions of the hull to provide a vertical space therebetween, and thereafter securing the strake-like structure into the space and securing the strake-like structure to the hull portions to effectively force the lower portion thereof downwardly.

It is yet still an additional object of the present invention to increase the load carrying capacity of a vessel by slicing or cutting the hull of the vessel in a longitudinal direction throughout a substantial extent thereof into several hull portions, separating the hull portions relative to each other to define a space therebetween, and inserting strake-like structure in the space provided between the hull portions of the vessel, without increasing the longitudinal dimension of the ship between the bow and stern.

Other objects and important features of the inventive concept of this application will be apparent from a study of the remaining descriptive portion of the specification which, when taken with the drawing, shows, describes, discloses and illustrates the preferred embodiment together with several modifications of the improved method for increasing the load carrying capacity of a vessel and what is now considered to be the best mode of practicing the principles thereof. Still other embodiments or modifications may be suggested to those having the benefits of the teachings herein and such other embodiments or modifications are intended to be reserved especially as they fall within the scope and spirit of the subjoined claims.

In the drawings:

FIGURE 3 is an enlarged transverse sectional view of the vessel 10 taken along the line 3—3 in FIGURE 2 looking in the direction of the arrows;

Attention is now directed to the drawing wherein a vessel 10 is shown, for the purpose of illustration only, as a Great Lakes Type Bulk Carrier and it is to be understood, without any exceptions, that other cargo types or classes of vessels than a Great Lakes Carrier, including passenger steamers and the like, may be just as suitable for having the principles of this invention applied and incorporated therein.

The vessel 10 is provided with a hull 12 having generally verticaly disposed, i.e., more vertical than horizontal, substantially longitudinally extending side portions 14 and a keel portion 16, each of which extends throughout the full longitudinal extent of the vessel 10.

The vessel 10 is further provided with a bow portion 18, a stern portion 20, and a generally horizontally disposed spar deck 22 which is the uppermost deck of the vessel 10 and extends substantially the full length thereof between the side portions 14 of the hull 12. The spar deck 22 is provided with a bridge house 24 adjacent the bow portion 18 and a deck house 26 adjacent the stern portion 20 which deck house has a stack 28 that extends therethrough for communicating with engine and fire rooms 32, disposed below the deck house 26 within the confines of the hull 12 of the vessel 10.

The vessel's hull 12, forward of the engine and fire rooms 32 is provided with cargo carrying holds A, B, C and D, each of which is defined by bottom 34 and side 36 ballast tanks with the holds A, B, C and D extending substantially the full depth of the hull 12 between the tanks 34-36 and the spar deck 22 and substantially the full breadth or width of the vessel between the side portions 14 of the hull 12 and amidships or intermediate the bridge 24 and deck houses 26, as will now be described and disclosed in more detail.

Figure 1:
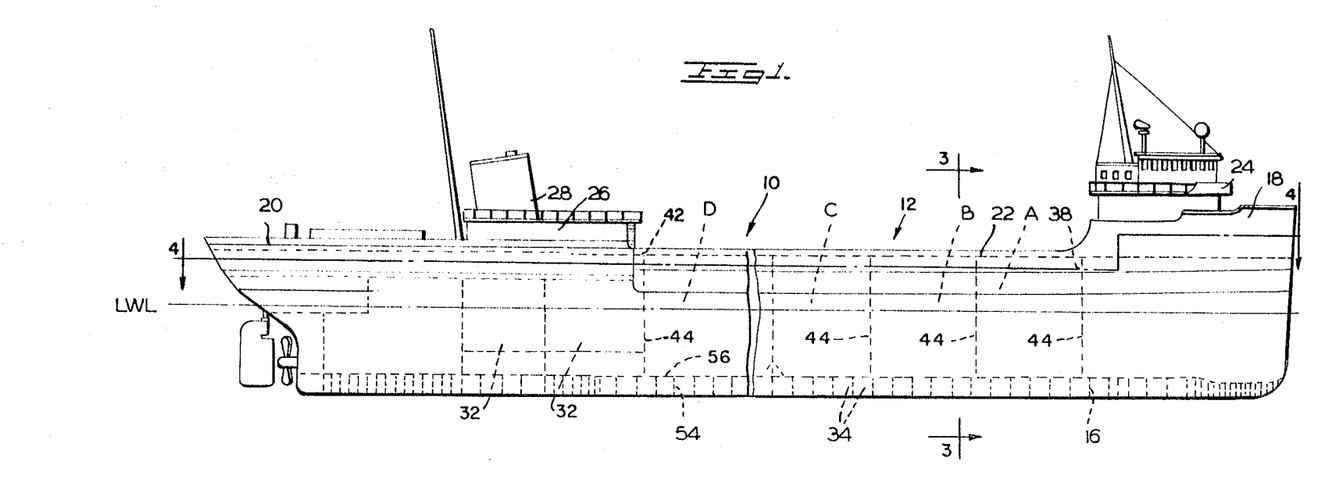
FIGURE 1 is a side elevational view of a vessel of the Great Lakes cargo carrying type having the improved apparatus of this invention incorporated therein to increase the load carrying capacity thereof without substantially altering the assigned load water line therein.
Figure 4:
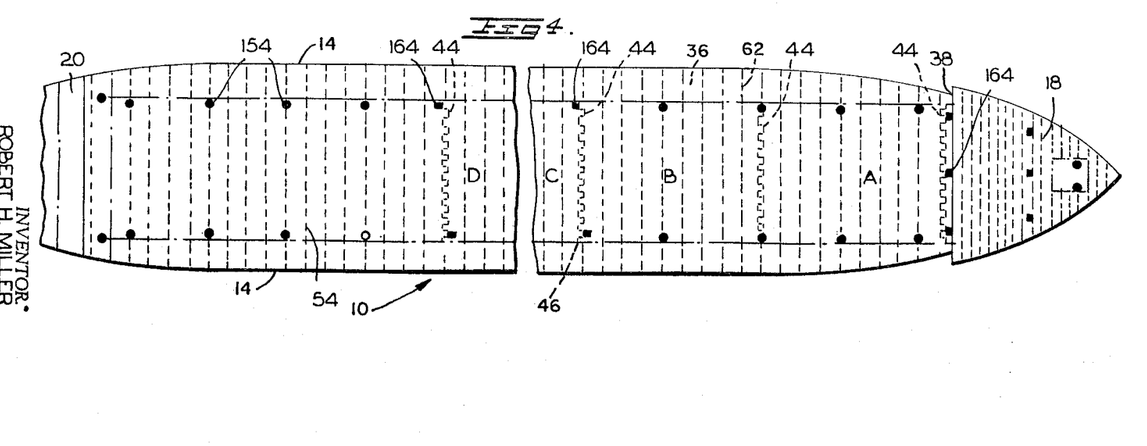
FIGURE 4 is a diagrammatical plan view taken along the line 4—4 illustrating an arrangement of supports for positioning parts of the vessel's hull in vertically spaced relationship relative to each other to enable apparatus in the form of strake-like structure to be inserted into the space and attached to the severed parts.

Referring to FIGURES 1 and 4 of the drawing, the forwardmost cargo hold A extends to a location 38 adjacent the rear of the bridge house 24 while the rear or stern most cargo hold D is disposed adjacent the forward end of the engine and fire rooms 32 and adjacent the forward end of the deck house 26 and terminates at a location 42.

The cargo holds A, B, C and D are partitioned off from each other by substantially vertically disposed and generally transversely extending bulk heads 44 secured by welding or the like to the spar deck 22, the bottom tanks 34, and the opposite side portions 14 of the hull 12 at longitudinally spaced locations therealong which are intermediate the side tanks 36. Referring to FIGURES 3, 7, 8 and 9, each of the cargo holds A, B, C and D is provided with openings 48 and hatch covers 52 disposed in the spar deck 22 for discharging material into and for removing the same therefrom which, as best seen in FIGURES 3, 7, 8 and 9 of the drawing, extend substantially the full width of the respective holds A, B, C and D.

As stated above, the vessel 10 is provided with the horizontally disposed bottom ballast tanks 34 which may also be provided with bulkheads 54 which structurally reinforce the bottom of the vessel 10 and bulkheads 54 have the upper edges thereof secured by welding or the like to a tank top plate 56 and the lower edges secured to the bottom of the hull 12 with the opposite end edges thereof extending completely athwartships and secured to the opposite side portions 14 of the hull 12. The transverse reinforcing tank bulkheads 54 are disposed at spaced intervals along the longitudinal extent of the vessel 10, as illustrated in FIGURE 1, from the bow portion 18 to the stern portion 20 of the vessel 10 and shall be more commonly referred to herein as frames 54.

Figure 7:
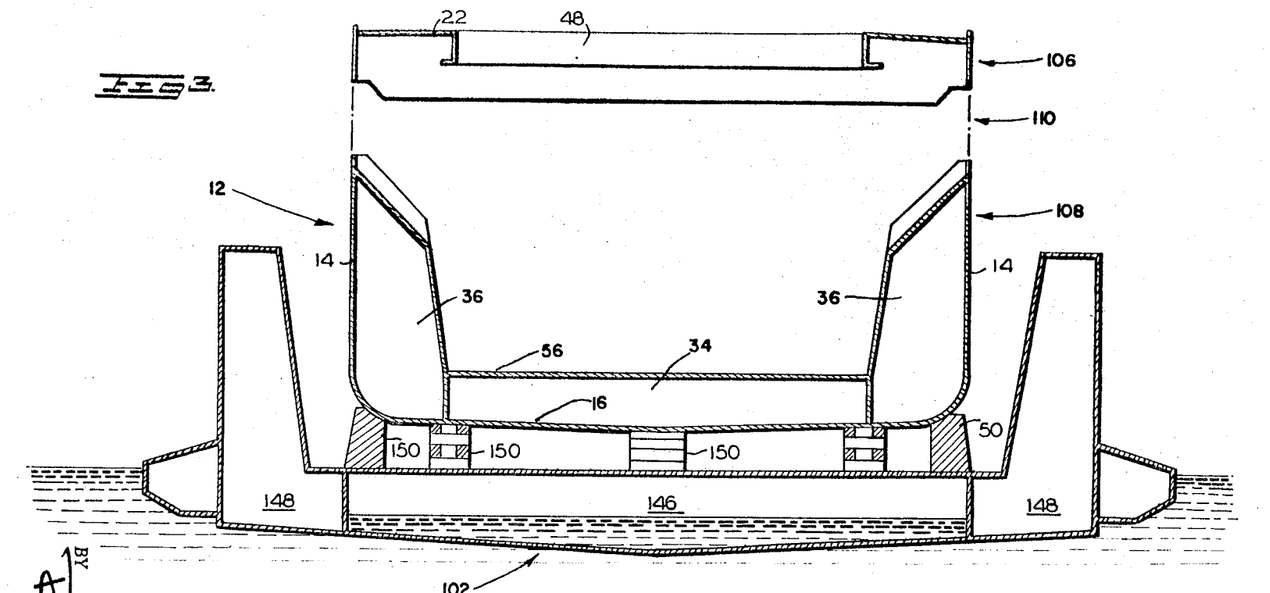
FIGURE 7 is an enlarged transverse sectional view of the vessel taken along the main structural arch supports thereof adjacent the load carrying areas and showing the supports properly positioned for spacing the parts of the hull to enable the apparatus to be secured therein.
Figure 8:
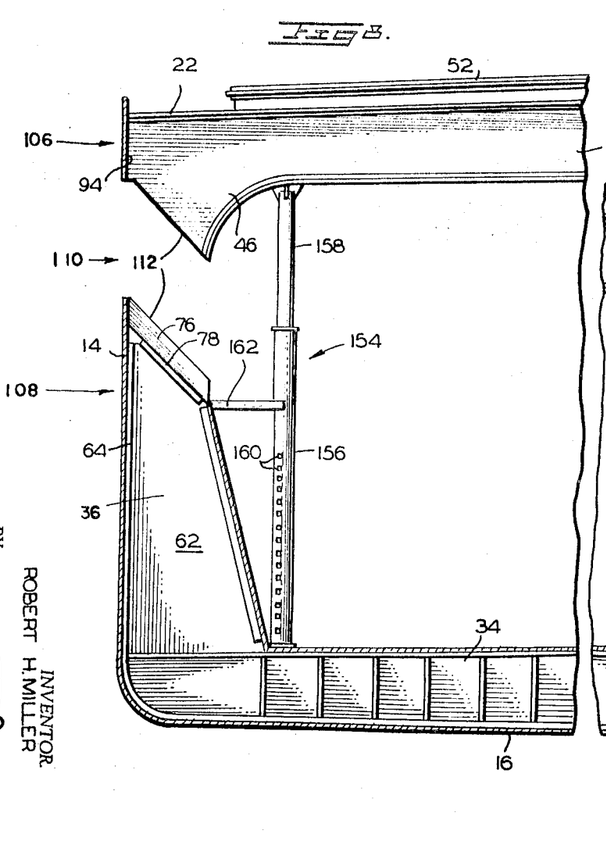
FIGURE 8 is a view similar to FIGURE 7 but illustrating the upper part of the vessel's hull in the spaced position.

Generally vertically disposed or upstanding, laterally projecting structural members or arch supports 62, best shown in FIGURES 7 and 8 of the drawing, are disposed at spaced intervals longitudinally of the vessel 10 in the area of the side tanks 36 for reinforcing the hull 12 of the vessel 10. The structural members 62 have a substantially vertical outer side or edge provided with flanges 64 that extend generally in a fore and aft direction to opposite sides of the respective laterally or transversely projection structure member 62. A lower portion 66 of the respective structural member 62 is substantially wider than the upper portion 68 thereof, and the inner side or edge 72 of the respective structural member 62 is sloped, inclined or upwardly and outwardly disposed in diverging relationship relative to the edge 72 of the opposed support 62 with the respective edges 72 thereof being provided with fore and aft extending flanges 74 thereon formed by I-beams, as best shown in FIGURE 10 of the drawing.

Figure 9:
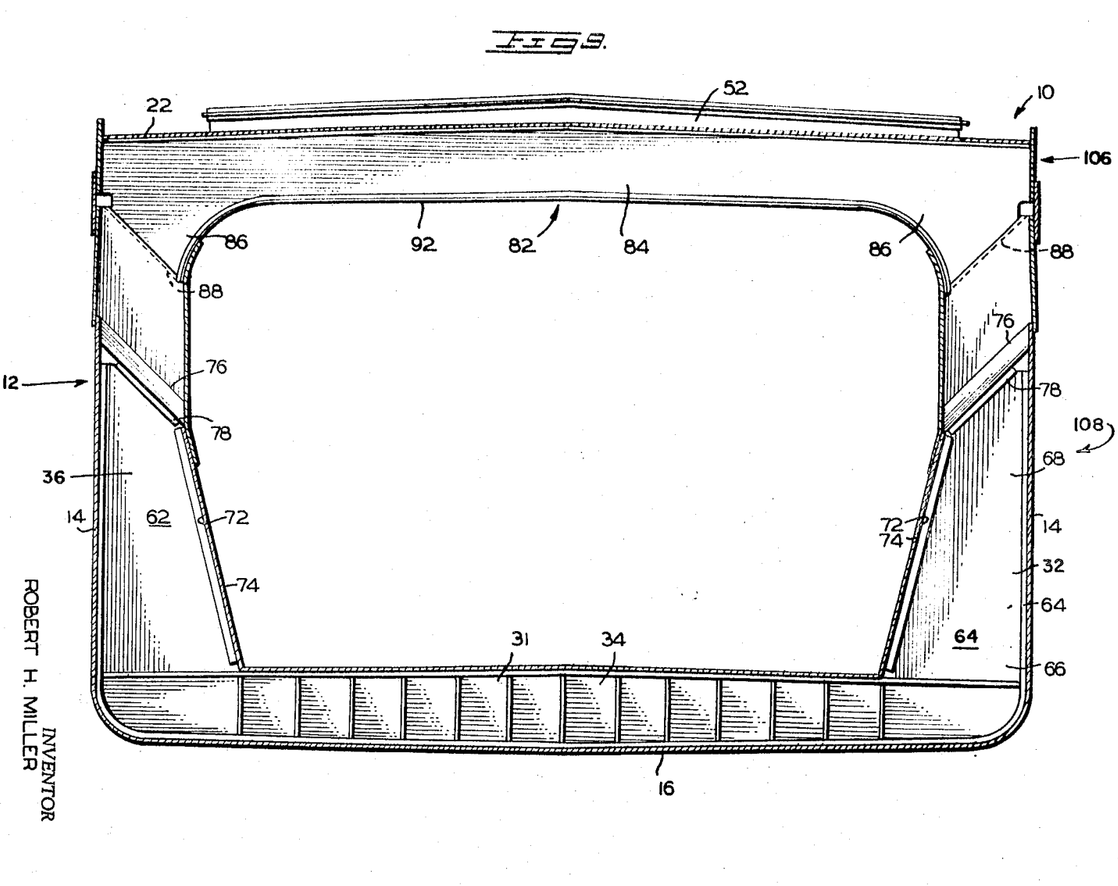
FIGURE 9 is a transverse sectional view of the vessel similar to FIGURES 7 and 8 of the drawing showing the apparatus properly secured to the spaced parts of the vessel's hull within the space that had been created therebetween.
Figure 12:
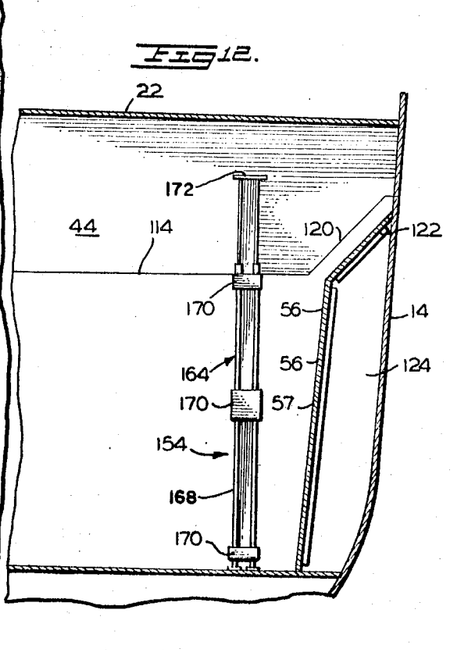
FIGURE 12 is an enlarged transverse sectional view of the vessel taken along a bulkhead of the vessel's hull showing the supports properly positioned for spacing the parts of the hull and is similar to FIGURE 7 of the drawing.
Figure 13:
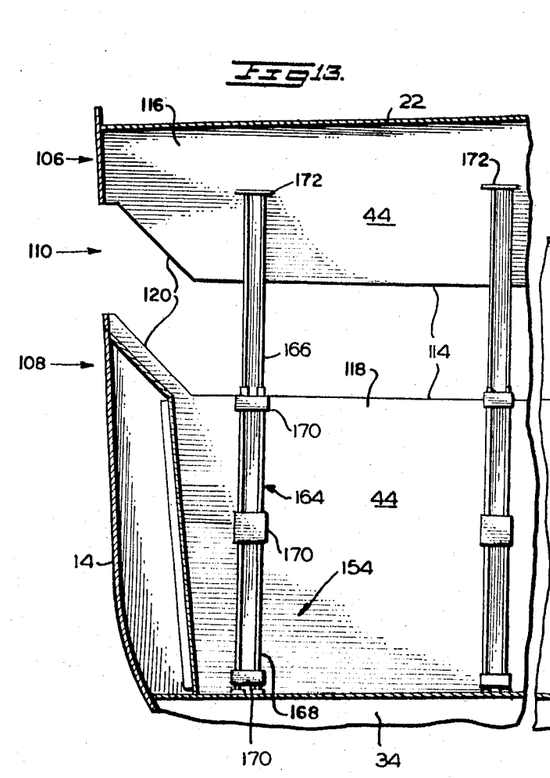
FIGURE 13 is a view similar to FIGURE 12 illustrating the parts of the vessel's hull in the spaced relationship and showing the arrangement of the supports at such location.

The various structural members 62 have the flanges 64, 74, the portions 66, 68 and the edges 72 respectively, rigidly secured to the adjacent portions of the hull 12 by any suitable method, such as welding, and the arrangement thereof for locations on the vessel 10 which is adjacent the holds A, B, C and D, is best illustrated in FIGURES 7, 8 and 9 of the drawing while locations which are adjacent the bulkheads 44 which partition and separate the holds A, B, C and D are best shown in FIGURES 12 and 13.

The structural members 62 on both sides of the vessel 10 are substantially identical and preferably less in number than the transverse frames 54.

Figures 10, 11:
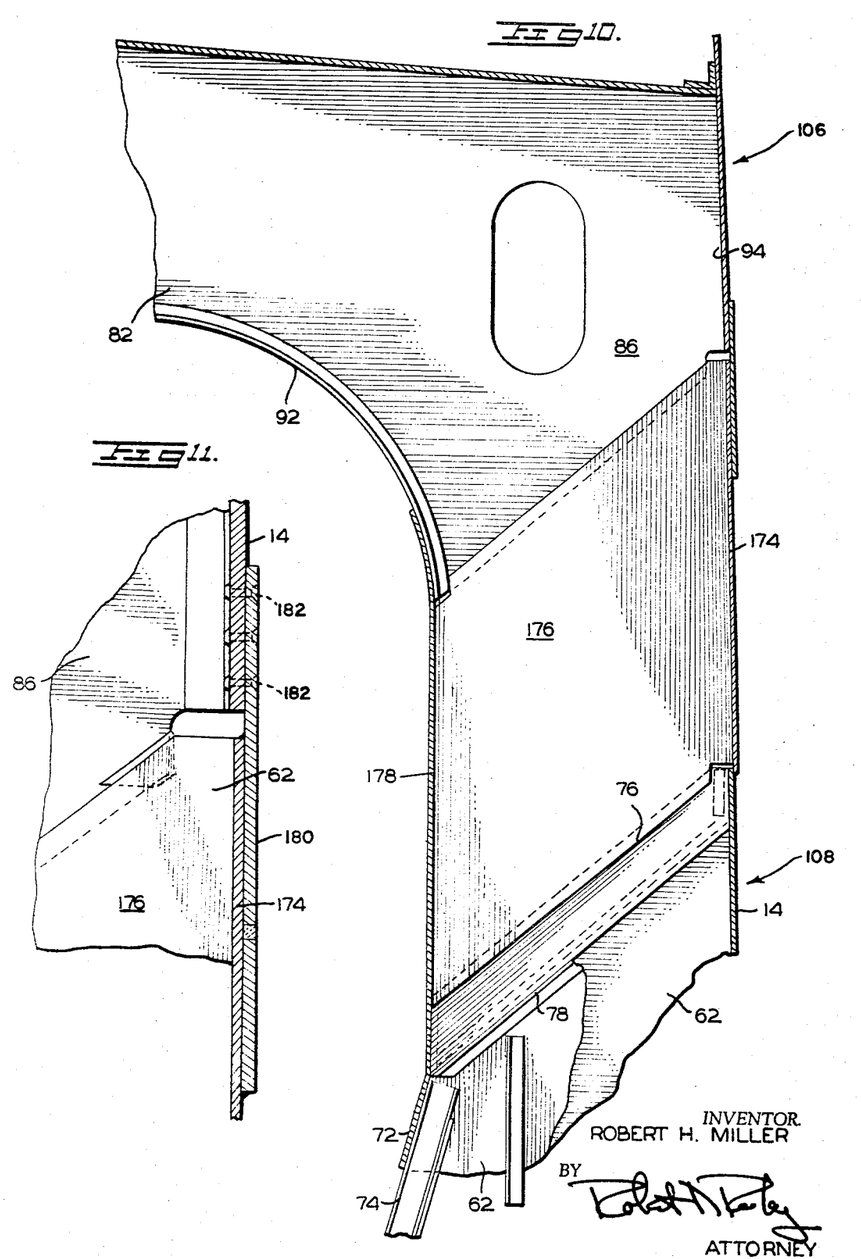
FIGURE 10 is an enlarged fragmentary transverse sectional view showing the details of the securement of the apparatus to the parts of the vessel's hull as illustrated in FIGURE 9.
FIGURE 11 is an enlarged fragmentary lateral sectional view similar to FIGURE 10 but taken adjacent a bulkhead of the vessel showing the apparatus being attached thereto.

The upper portion 68 of each of the structural members 62 is sloped along an upper edge 76 at a greater angle taken from the vertical than the slope or incline of the edges 72 with the upper edges 76 being also provided with fore and aft extending flanges or rims 78 disposed at the same inclination or angle to the vertical as the sloped upper edge 76 but spaced downwardly therefrom, as best seen in FIGURE 10.

At locations which are adjacent the holds A, B, C and D, the upper portion of the hull 12 is laterally reinforced and the spar deck 22 is vertically supported by a plurality of longitudinally spaced apart transversely extending structural members, arches or webs 82 secured to the vertical structural members 62. The transverse structural members or arches 82 comprise a central horizontal portion 84 and two oppositely disposed downwadly extending portions 86. The downwardly extending portions 86 have sloped lower edges 88 as best seen in FIGURES 7 and 8 which are inclined at the same angle as the sloped upper edges 76 of the support members 62 so that the edges 88 can rest on the flanges or rims 78 and overlap the portions of the structural support members 62. The lower edges 88 of the arches 82 are suitably secured by welding or the like to the flanges or rims 78 so that the transverse structural members or arches 82 and the vertical structural members 62 nest together to form a rigid structure. Fore and aft extending flanges 92, similar to the flanges 74, are provided along the lower inner edges of the transverse structural members or arches 82. The outer edge portions 94 of the transverse structural members or arches 82 are respectively suitably secured to the inner surface of the hull 12.

At the space intevals along the longitudinal extent of the vessel 10 whereat the bulkheads 44 are located, it is to be understood that the bulkheads 44 will provide the necessary lateral reinforcement for the hull 12 and the vertical support for the spar deck 22.

In order to increase the load carrying capacity of the vessel 10 without affecting the assigned load water line LWL thereof, attention is now directed to FIGURES 2 through 13 of the drawing wherein there is illustrated one method and the preferred apparatus which enables the vessel 10 to carry a greater load without exceeding or altering the assinged load water line LWL thereof.

Briefly, the novel method of this invention comprises the slicing, cutting, severing or in any suitable way by any suitable process, a hull of a vessel into at least two parts along a generally horizontally disposed parting, plane or area, separating the several parts of the hull by raising one part relative to the other part to define a space therebetween, and thereafter placing apparatus, preferably in the form of strake-like structure, into the space and securing the strake-like structure to each of the parts and then effectively forcing the other part of the hull downwardly to enable the vessel to have or possess an increased load-carrying capacity without substantially altering or exceeding the load water line LWL thereof.

In view of the act that vessels are of distinct types and classes it may be desirable to vary, alter or change certain of the steps of the method of this invention as described and disclosed herein, for example:

(1) Under certain conditions it may be more desirable to sever the hull of the vessel throughout the full longitudinal extent thereof while with other conditions it may be less desirable to so completely sever the hull and more desirable to only partially sever the hull prior to placing same in a drydock installation or facility, such as (a) from the bow portion to adjacent the stern portion only (b) from the stern portion to adjacent the bow portion only, and (c) only that portion of the hull which is amidship or intermediate the bow and stern portions thereof.

(2) Obviously, the vessel must be supported while the various operations of the method are being performed and in certain instances a floating drydock installation or facility will be more advantageous than a conventional stationary type of drydock installation or facility.

(3) Also, it may be highly desirable to initially sever only portions of the hull prior to the support thereof in the selected type of drydock installation or facility while it may be more desirable, at certain times, to not so initially sever any portion of the hull until it is properly supported and then sever the hull.

Figure 2:
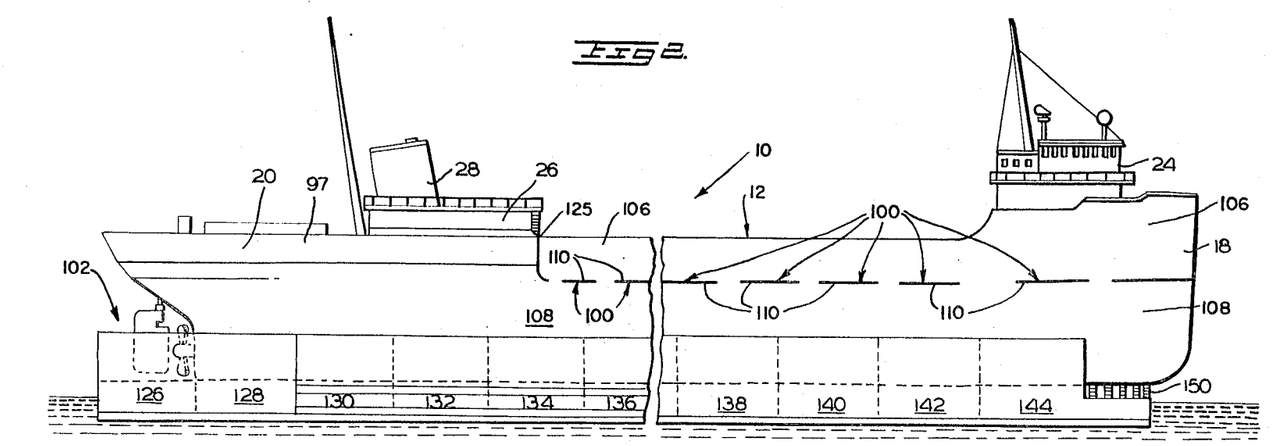
FIGURE 2 is a side elevational view of the vessel illustrated in FIGURE 1 with the vessel being illustrated as being supported in a floating drydock installation or facility and showing a modification of the method wherein the hull of the vessel is initially partially severed into at least two parts in accordance with the method of this invention.

Accordingly, there is described and disclosed herein one method employing certain selected ones of several alternative steps, as identified above, for modifying a vessel in a manner which will enable the vessel to have an increased load carrying capacity without substantially altering, modifying or exceeding the assigned load water line thereof wherein the hull 12 of the vessel 10 may be first initially partially cut, sliced, parted, or in any way weakened along a plurality of areas 100 which are generally disposed in a common substantially horizontal, i.e., more horizontal than vertical, plane with the areas 100 being preferably in the vicinity of or adjacent to the load carrying portion of the vessel 10, such as the cargo holds A, B, C, D of a Great Lakes type vessel, as illustrated in FIGURE 2 of the drawing with the initial partial severing areas 100 extending from the stem or bow portion 18 of the vessel 10 to adjacent the location 42 and terminating short of the deck house 26. This initial partial cutting may be accomplished while the vessel 10 is riding in the water and before it is put into a drydock installation or facility 102.

In the modification of the method of this invention previously referred to in FIGURE 2 of the drawing wherein the initial partial areas 100 were cut or sliced in this modification the adjacent areas 100 along each side portion 14 of the hull 12 are connected to completely sever the hull portion 12 and that at least two parts 106 and 108 along a generally horizontally disposed parting 110. It is to be understood that in the absence of initially partially severing the hull 12 of the vessel 10 along the areas 100, it is possible and in certain instances highly desirable that the parting 110 be a continuous cut or slice which may be made either in the fore to aft or aft to fore direction relative to the hull 12.

As shown in FIGURES 7, 8 and 9 the upstanding arch supports 62 are each laterally severed to define a parting 112 with the lateral plane of the parting 112 being inclined to define the inclined upper edges 76 and rims 78 of the arched support 62.

Further, the bulkheads 44 of the hull 12 are each severed along a parting 114 as illustrated in FIGURES 12 and 13 of the drawing to sever each of the bulkheads into an upper portion 116 and a lower portion 118 which have upwardly diverging edge portions 120 disposed at an angle to conform with the inclined angle of the upper edge plates 122 of upstanding reinforcing wide struts 124 that are secured to the inside of the side portions 14 of the hull 12.

It is to be noted that in each instance the partings 110, 112 and 114 extend substantially horizontally relative to the hull 12 of the vessel 10 and it is not necessary that each of the partings 110, 112, 114 be disposed in a common plane but definite controls and tolerances are maintained to assure that the partings 110 on each side of the hull 12 are substantially within a common horizontally disposed plane with the laterally extending partings 114, 116, also being in substantially horizontally, respectively disposed common planes.

In actual practice, in performing the modification of the method disclosed in the drawing of this application, the areas 100 are first cut or sliced in approximately 18-foot lengths in longitudinal directions along the sides 14 of the hull 12 and the areas 100 are cut or sliced prior to the slicing or cutting of the laterally extending partings 112 and 114. The partially initially severed hull 12 of the vessel 10 is then placed in the drydock installation or facility 102 are properly cribbed, blocked and shorted, as will be explained in more detail hereinafter.

The adjacent areas 100 along each side of the hull 12 of the vessel 10 are then connected to form a continuous cut or slice along each side portion 14 of the vessel 10.

Figure 5:
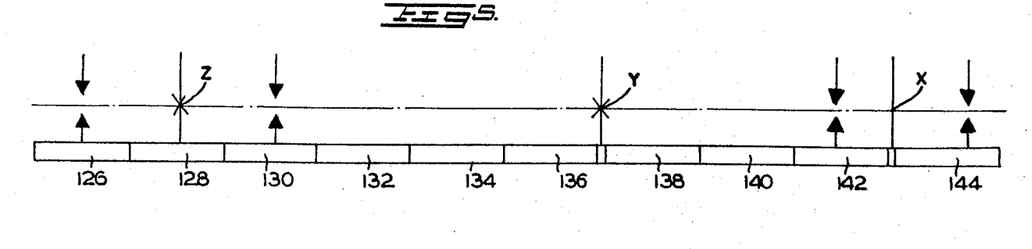
FIGURE 5 is a diagram illustrating the sighting and ballasting of the drydock installation or facility illustrated in FIGURES 2 and 3 so as to maintain the vessel in proper trim therein while carrying out the method embodied in the present invention.
Figure 6:
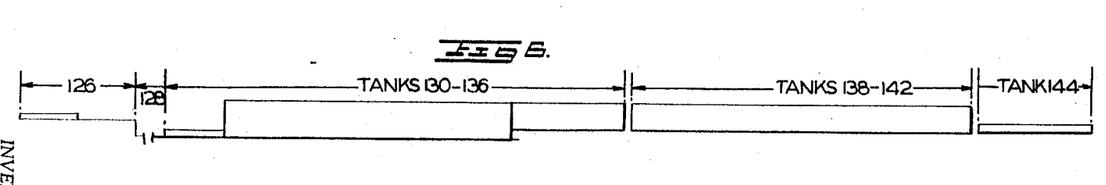
FIGURE 6 is a diagram illustrating the approximate ballasting of the ballast tanks of the drydock installation or facility for properly maintaining the vessel therein while carrying out the method of the present invention.

In this manner, by not completely severing the hull 12 of the vessel 10 into the separate parts 106 and 108 and with the bulkheads 44, arch supports 62 and arches 82 intact, there is formed a skeleton frame which is capable of maintaining the vessel 10 afloat for positioning into the drydock installation or facility 102 but which is also flexible to a degree which enables the trim of the vessel 10 to be modified, corrected, or in other ways changed from the trim which the vessel 10 has had and by reason of the cribbing, blocking and shoring and in instances where a floating drydock installation or facility is used, it is possible that the trim will be altered to a desired trim such as that which the vessel 10 possessed when originally built and in FIGURES 5 and 6 of the drawing, diagrammatic illustrations are shown for controlling the trim of the vessel 10 when placed in the drydock installation or facility 102.

Thereafter, the areas 100 are joined, as stated above, and the laterally extending partings 112 and 114 are cut or sliced to sever the parts 106 and 108 of the hull 12 from each other. In actual practice, it has been found most desirable to sever the parts 106 and 108 by starting at the bow portion 18 and working toward the stern portion 20 thereof.

If the hull 12 of the vessel 10 is to be completely severed into the upper 106 and the lower 108 parts throughout the full longitudinal extent thereof, there is no need to be concerned about cutting certain portions of the vessel 10 such as the spar deck 22, bridge or deck houses 17, 18, etc., and on completion of the partings 110, 112 and 114, the hull 12 will be completely severed into the two parts 106 and 108. However, in situations where it is desirable to completely sever the hull 12 into the parts 106 and 108, great care and much difficulty will be had in the modification of the various devices which are employed to power the vessel, for example, and it has been found that in actual practice it is more inexpensive to not sever the hull 12 of the vessel 10 adjacent the engine and the fire rooms 32 and deck house 26 in view of the fact that such process will require additional expense and will in effect not increase the load-carrying capacity of the vessel.

Devices which will normally be present in the engine and fire rooms 32 will not be present below that portion of the vessel 10 described herein as the bridge house 24. However, there is still some additional expense and necessary modification of the machinery which exists in and below the bridge house 24 when the side portions 14 which are adjacent thereto are severed.

In the modification as illustrated of the method of this invention, on completion of the partings 110, 112 and 114, it is only necessary to sever the upper part 106 from the vessel 10 along a transversely extending parting 125 which includes severing the spar deck and the other facilities of the vessel 10 so that upper part 106 is completely severed from the lower part 108 of the hull 12.

The drydock installation or facility 102 is provided with a set or series of similar side ballast tanks indicated as 126, 128, 130, 132, 134, 136, 138, 140, 142 and 144, as shown in FIGURE 2. Referring to FIGURE 3, each set of these ballast tanks consists of three tanks laterally secured abreast of one another, for example, a center tank 146 and two wing tanks 148 disposed to opposite sides of the center tank. The drydock installation or facility 102 is further provided with well known cribbing, blocking and shorting means 150 which are properly supported by the drydock installation or facility to support the hull 12 of the vessel 10 when positioned therein. The drydock installation or facility 102 has the ballast tanks 126–144 filled with fluid, submerged so that the vessel 10 may be navigated thereto. After the vessel 10 has been maneuvered into the submerged drydock facility or installation 102, properly positioned and supported by the cribbing, blocking and shoring means 150, the fluid ballast is pumped out of the respective drydock ballast tanks 126–144, according to a predetermined buoyant force arrangement for controlling the trim of the vessel 10 with the drydock facility or installation 102 being disposed with a freeboard that enables the entire hull 12 of the vessel 10 to be maintained out of the water level which is buoyantly supported by the drydock facility or installation 102.

The trim of the vessel 10, when supported in the drydock installation or facility 102, as stated above, may be controlled by the cribbing, blocking and shoring means 150 to eliminate any hog or camel configuration which the vessel 10 has assumed due to use. Also, the ballasting of the tanks 126–144 which define the drydock installation or facility 102 is effective in controlling the trim of the vessel 10 during the modification thereof.

As illustrated diagrammatically in FIGURES 2, 5 and 6 of the drawing, the bow portion 18 of the vessel 10 is controlled by the tanks 140, 142, 144; the amidship portion by the tanks 132, 134, 136, 138, and the stern portion 20 by the tanks 126, 128, 130.

Suitable sights, measurements and other controls are continuously made between various points X, Y and Z of the vessel 10 in order to ascertain the existing trim thereof at any designated period during the operational steps of the method. Diagrammatically the point X represents the bow portion 18 of the vessel 10; the point Y represents the amidship portion, and the point Z represents the stern portion 20.

Continuous movements, sights and readings are taken as work in ballasting the tanks 126–144 progresses and the ballast is constantly adjusted to achieve the desired trim.

Referring to FIGURE 6 of the drawing, this diagram illustrates the approximate amount of ballast in the tanks 126–144 when the vessel 10 is properly positioned for separating the parts 106 and 108 of the hull 12.

The object of the continuously and controllably trimming the vessel 10 when in the drydock installation or facility 102 is so that there will be no undue or unnatural stresses set up in the hull 12 of the vessel 10 during the cutting or slicing operation in severing the hull 12 into the parts 106 and 108. In other words, since the vessel 10 has assumed a natural set, camel or hogging after use, the modification of the vessel 10 to increase the load carrying capacity thereof should in no way conflict or interfere with the vessel's original natural trim.

An arrangement of support mechanisms 154 is provided for supporting the upper part 106 of the hull from the lower part 108 thereof and, in the preferred embodiment of the invention, the mechanism 154 comprises a plurality of longitudinally extensible elongate jack-like mechanisms which, when properly positioned, as illustrated in FIGURE 4 of the drawing, may be extended to position the parts 106 and 108 in spaced relationship relative to each other throughout the extent of the partings 110, 112, 114 and 126. The extension of the mechanisms 154 may be as a result of hydraulic or mechanical action and is conducted in a sequence of many separate extensions of small increments until the desired height of the space between the parts 106 and 108 has reached the desired distance as shown in FIGURES 8 and 13 of the drawing.

In FIGURES 7 and 8 of the drawing, the jack-like mechanisms 154 are illustrated as a conventional type of pipe jack having a fixed stanchion member 156 and a movable member 158 which telescopes into the fixed member 156. The fixed member 158 is provided with a plurality of vertically spaced openings 160 through which pins or the like may be inserted to hold the movable member 158 in the properly raised position during the progressive movement of the upper part 100 relative to the lower part 108. Each of the jack-like mechanisms 154 has the lower end thereof welded to the bottom of the respective holds A, B, C, or D, as the case may be, and is further provided with bracings 162 welded to the adjacent vertical structural support member 62 and to the fixed member 156. The pipe-like mechanisms 154 are disposed within the hull 12 in vertical alignment with the vertical structural or arch support members 62 so that the movable pipe member 158 thereof bears against and lifts the transverse structural members 82 of the vessel 10. The head or top of the movable members 158 are secured to the respective transverse structural members 82 by means such as welding, or the like.

Referring to FIGURES 12 and 13 of the drawing, the mechanisms 154 are illustrated as channel jacks 164 disposed adjacent the bulkheads 44 and are provided with a vertically movable section 166 which telescopes within a fixed section 168. The jacks 164 are disposed and supported on the bottom of the respective holds A, B, C or D, and are each provided with lug members 170 that are welded to the adjacent bulkhead 44. Head portions 172 are carried by the jacks 164 and are welded to an upper portion of the respective bulkhead 44.

After the jack-like mechanisms 154 have been properly positioned and secured as described above and as shown diagrammatically in FIGURE 4 of the drawing, the upper part 106 of the hull 12 is then ready to be raised or lifted from the lower part 108 thereof.

After the vessel 10 has been properly positioned and supported by the cribbing, blocking and shoring means 150 in the drydock installation or facility 102 with the proper trim being controlled by the ballasting of the tanks 126–144, the part 106 is completely severed from the part 108 of the hull 12, and the mechanisms 154 properly positioned, the mechanisms 154 are simultaneously progressively extended in minute increments so that no undue stresses are set up in the vessel 10 while the upper part 106 is being lifted from the lower part 108 of the hull 12 a predetermined distance, for example: in actual practice, during the modification of the Great Lakes Steamer *William A. Reiss* the part thereof which corresponds to the upper part 106 of the vessel 10 was spaced from the corresponding part 108 a distance of approximately 7 feet 6 inches which increased the load-carrying capacity of the vessel one-third.

When the parts 106 and 108 of the hull 12 have been properly spaced relative to each other a distance as desired, there is then placed into the space structure 174 which is in the form of strake-like plates that are secured to the parts 106 and 108.

Referring to FIGURES 10 and 11 of the drawing the space between the separated parts 106 and 108 of the hull 12 is provided with vertically disposed laterally extending structural extension members 176. The structural extension members 176 each has the upper and lower edges thereof sloped or inclined in a similar manner as the edges of the adjacent support members 62 and arches 82 and overlap the respective adjacent edges thereof as shown in more detail in FIGURE 10. The members 176 are provided with a flange member 178 that overlaps the edges 72 and 92 of the respective support members 62 and arches 82 and are welded thereto.

The strake-like structure 174 is secured to the outer edge of the extension member 176 and overlaps the lower part 106 of the hull 12 to which the strake-like structure 174 is secured by welding. The upper end of the strake-like structure 174 is provided with an outwardly offset plate portion 180 welded thereto that overlaps the upper part 106 of the hull 12 adjacent the outer edge 94 of the transverse structural member or arch 82. Rivets 182 may be employed for securing the portion of the hull 12 adjacent the downwardly extending portions 86 of the transverse structural members 82 to the overlapping plate portion 180. Other brace means, well known in the art, may be utilized to properly secure the extension members 176 to the horizontal and vertical structural members 62 and 82, respectively, and to the strake-like structure 174, if desired.

The space formed between the separated edges along the portion 114 of the bulkhead 44 is also provided with an insert member, not shown, extending athwartships in overlapping relationship to the edges along the parting 114 so as to maintain and provide a closed partition between the adjacent holds A, B, C, D.

While the invention has been described in terms of certain embodiments or modifications which it has assumed in practice, the scope of the invention should not be deemed to be limited by the precise certain embodiments or modifications as herein shown, described, disclosed and illustrated, such other embodiments or modifications being intended to be reserved especially as they fall within the scope of the claims here appended.

What is claimed as my invention is:

1. A method of modifying the trim of a vessel having a hull, said method comprising,
    at least partially slicing the hull of the vessel along the the side portions thereof to effectively weaken the hull,
    supporting the weakened hull of the vessel in a floating drydock installation,
    ballasting the floating drydock installation according to predetermined programming to modify the trim of the vessel as desired,
    thereafter providing structure in the weakened sliced side portions of the hull, and
    then securing the structure to the side portions of the hull.

2. A method of modifying a vessel having a hull to increase the load carrying capacity of the vessel without substantially altering the assigned load water line thereof, said method comprising the steps of
    at least partially slicing the hull of the vessel in a generally longitudinal direction at spaced intervals along substantially horizontally disposed partings,
    positioning the vessel at an installation,
    supporting the vessel at the installation to control the trim of the vessel,
    severing the hull of the vessel into upper and lower parts by completing the partial slicing thereof and also slicing the hull of the vessel generally transversely as required,
    supporting the upper part of the hull of the vessel by the lower part thereof,
    raising the upper part of the hull of the vessel relative to the lower part thereof a given distance to define a space therebetween, and
    connecting strake-like structure between the upper and lower parts of the hull of the vessel in the space therebetween.

3. A method of modifying the trim of a hull of a vessel, said method comprising:
    at least partially severing the hull of the vessel along a plurality of designated areas to effectively weaken the hull,
    supporting the weakened hull of the vessel at an installation,
    varying the support of the weakened hull at the installation according to predetermined programming to modify the trim of the hull of the vessel as desired, and thereafter
    securing structure in the weakened areas of the hull of the vessel.

4. The method of increasing the load carrying capacity of a hull of a vessel comprising:
    positioning the hull of the vessel in a drydock type of installation,
    supporting the hull of the vessel in the drydock installation,
    separating the hull portion of the vessel into at least an upper and a lower portion,
    supporting the upper portion of the hull of the vessel by the lower portion thereof, trimming the lower portion of the vessel by varying the support thereof, raising the upper portion of the hull of the vessel relative to the lower portion thereof to create a space therebetween, placing strake-like structure in the space between the upper and lower portions of the hull of the vessel with said structure spanning the space, and securing the structure to the upper and lower portions of the hull of the vessel.

References Cited
UNITED STATES PATENTS

| | | | |
|---|---|---|---|
| 1,061,153 | 5/1913 | Wolfe | 114—77 |
| 2,834,311 | 5/1958 | Engstrand | 114—45 |
| 2,894,472 | 7/1959 | Foster | 114—45 |
| 3,111,925 | 11/1963 | Hayashi | 114—77 |

MILTON BUCHLER, *Primary Examiner.*

T. M. BLIX, *Assistant Examiner.*